United States Patent
Merck et al.

(10) Patent No.: US 9,515,921 B2
(45) Date of Patent: Dec. 6, 2016

(54) RSTP AGGREGRATION SCHEME FOR ETHERNET NETWORKS

(71) Applicant: Crestron Electronics, Inc., Rockleigh, NJ (US)

(72) Inventors: Christopher Merck, Union City, NJ (US); Andrew Salmon, PlainField, NJ (US); Gennady Pratusevich, West Nyack, NY (US)

(73) Assignee: Crestron Electronics Inc., Rockleigh, NJ (US)

( * ) Notice: Subject to any disclaimer, the term of this patent is extended or adjusted under 35 U.S.C. 154(b) by 110 days.

(21) Appl. No.: 14/505,961

(22) Filed: Oct. 3, 2014

(65) Prior Publication Data

US 2015/0098362 A1    Apr. 9, 2015

Related U.S. Application Data

(60) Provisional application No. 61/886,392, filed on Oct. 3, 2013.

(51) Int. Cl.
*H04L 12/721* (2013.01)
*H04L 12/705* (2013.01)
*H04L 12/935* (2013.01)
*H04L 12/931* (2013.01)
*H04L 12/24* (2006.01)

(52) U.S. Cl.
CPC ............... *H04L 45/44* (2013.01); *H04L 41/12* (2013.01); *H04L 45/18* (2013.01); *H04L 45/66* (2013.01); *H04L 49/351* (2013.01)

(58) Field of Classification Search
CPC ....... H04L 41/12; H04L 45/02; H04L 45/18; H04L 48/44; H04L 45/48; H04L 45/54; H04L 45/60; H04L 45/66; H04L 45/74; H04L 49/25; H04L 49/351; H04L 49/352; H04L 69/26; H04L 12/44; H04L 12/462; H04L 2012/445

See application file for complete search history.

(56) References Cited

U.S. PATENT DOCUMENTS 7,570,601 B2 *  8/2009  Baird ...................... H04L 45/02
                                                        370/254

* cited by examiner

*Primary Examiner* — Timothy J Weidner
(74) *Attorney, Agent, or Firm* — Crestron Electronics Inc.

(57) ABSTRACT

A master Ethernet bridge for use in an Ethernet network that includes a master central processing unit and associated master Ethernet switch, and one or more slave central processing units, each having an associated slave Ethernet switch, each of the associated slave Ethernet switches connected to a plurality of input/output ports, and wherein each of the plurality of ports is assigned a respective port number, each of the ports being connected to one of the one or more of the cascaded Ethernet devices, and wherein each of the master CPU and slave CPUs includes memory that contains a program that embodies a plurality of Ethernet functions adapted to substantially prevent re-routing of Ethernet commands by providing a mapping function that correlates the plurality of ports to respective ones of the one or more slave CPU and slave Ethernet switch.

14 Claims, 9 Drawing Sheets

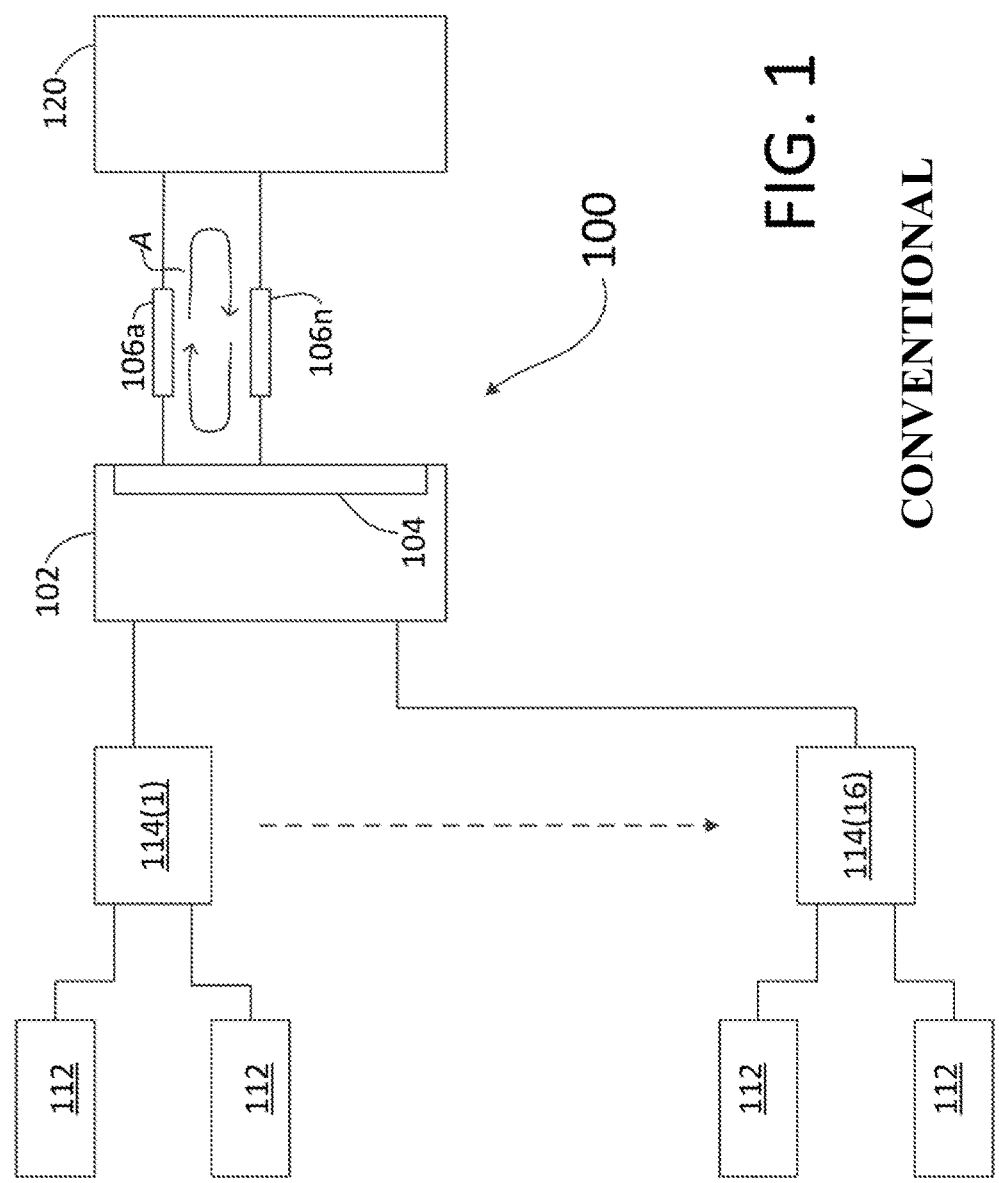
FIG. 1
CONVENTIONAL

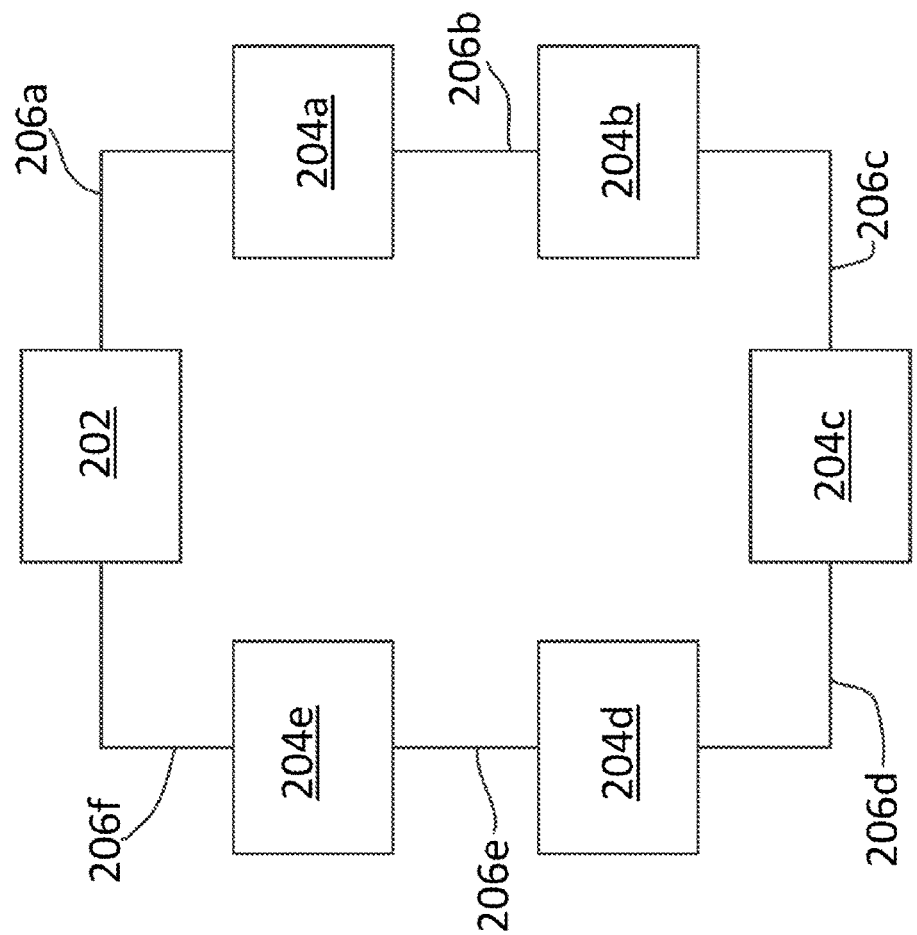
FIG. 2
CONVENTIONAL

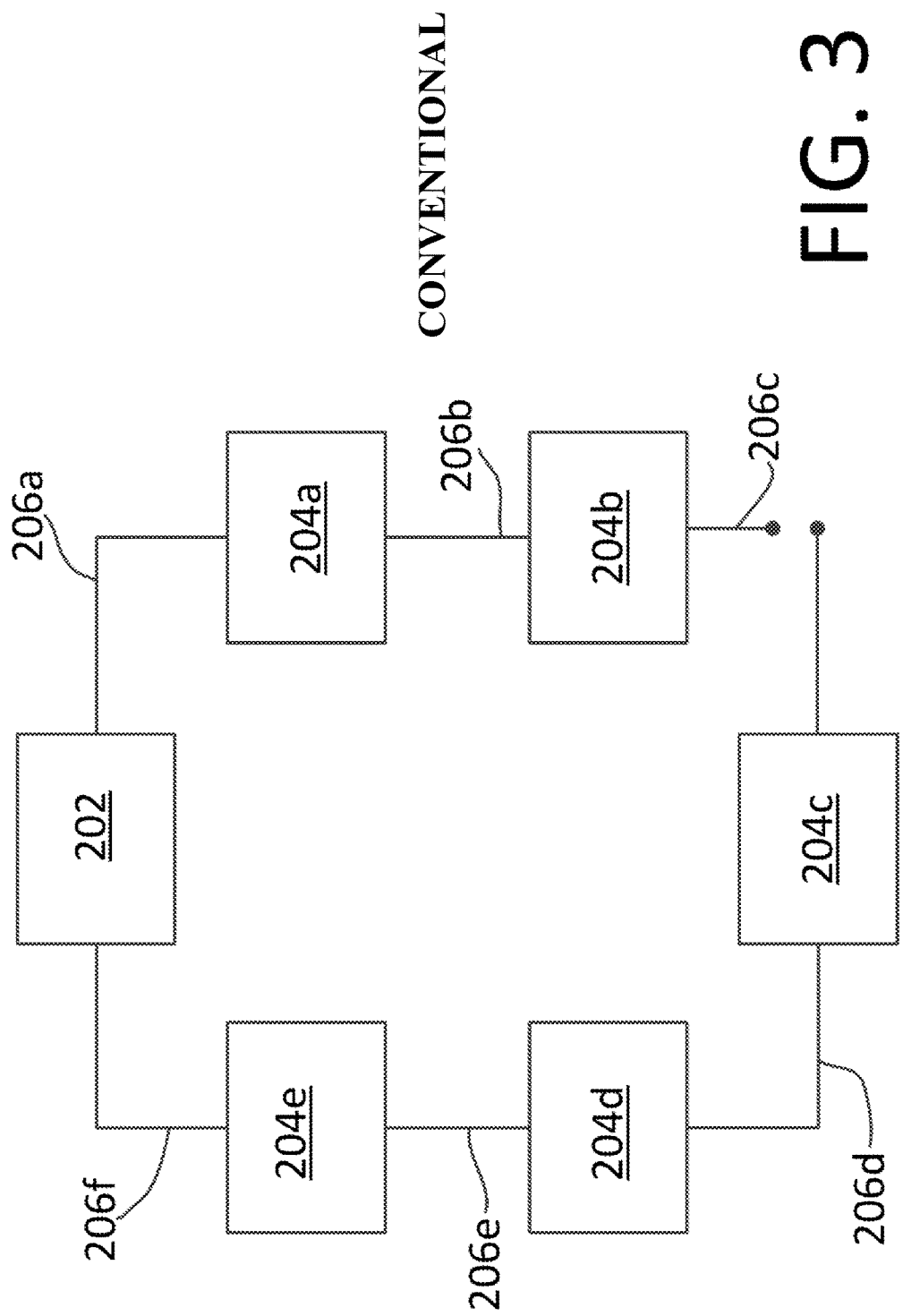
FIG. 3
CONVENTIONAL ic
RSTP AGGREGATION SCHEME FOR ETHERNET NETWORKS

PRIORITY INFORMATION

The present application claims priority under 35 U.S.C. §119(e) to U.S. Provisional Patent Application Ser. No. 61/886,392, filed Oct. 3, 2013, the entire contents of which are expressly incorporated herein by reference.

BACKGROUND OF THE INVENTION

Technical Field

Aspects of the embodiments relate to integrated network systems that include use of two or more Ethernet devices.

Background Art

It is a fundamental limitation of Ethernet networks that they not contain switching loops. FIG. 1 illustrates Ethernet network 100 in which a cycle can occur. In one series of applications, such Ethernet networks can be used in products manufactured by Crestron Electronics Inc. (from hereon in "Crestron"), and can include Digital Media (DM) products. From time-to-time within this discussion, reference will be made to certain one or more of products, systems, and protocols manufactured/designed/used by Crestron that include problems described in the Background Art section and further incorporate the aspects of the embodiments described below that solve those problems.

In FIG. 1, Ethernet network 100 includes main central processor unit (CPU) 102, CPU input/output (IO) 104, communication paths 106a-n, "Blades" (or 1:n multiplexors) 114(1)-(16), and a plurality of end points (EP) 112. Ethernet network 100 is also tied into another larger Ethernet network 120 via communication paths 106a-n. EP 112 can be any source or sink of video/audio/data. As those of skill in the art can appreciate, Ethernet applies to data-only communications, such data including system configuration data, by way of non-limiting example only. In particular, the data that is being communicated can include a product such as Cresnet connectivity, universal serial bus (USB) forwarding, and other product-internal communications. For example, in Crestron's DM products, video and audio are transmitted via time divisional multiplexing signal transmission (TDMS) scheme, not Ethernet. Nonetheless, Ethernet is used in video/audio switching operations in not only Crestron products, but other systems that transmit data, video, and audio signals as well. Typically, as shown in FIG. 1, each Blade 114 has 8 EPs 112, and there are typically up to 16 blades for each main CPU 102.

A switching loop is a transmission-retransmission that occurs repeatedly and rapidly, and often leads to what is then referred to as a packet storm. A switching loop exists whenever there is more than one active path between two endpoints in the network. The uncontrolled retransmission is the packet storm. Packet storms typically occur between devices that act as bridges. As those of skill in the art can appreciate, a bridge in an Ethernet network is a device that monitors and keeps track of other devices, such as EPs 112 that are connected to the bridge; that is, it knows, or creates a table, of the devices on its input and output so that it can correctly route Ethernet packets to the correct location. If a packet were to be received by a bridge, and it did not correspond to any device "downstream" the bridge would forward the packet to all ports other than the port on which the packet was received. However, each time the bridge receives a packet, the source address is added to the switching table for the port it was received on so that future packets destined for that address may be efficiently switched to the correct port only this promotes the efficient use of the network according to known Ethernet protocols. The repeated cycling transmission-retransmission of a message between a first device, for example CPU 102, and switch 108 (as shown as circular arrow line A), can create a packet storm. Such an event is called a packet storm because Ethernet transmits data/information on a packet basis (meaning the data in encapsulated within a packet on a packet-based network).

As those of skill in the art can appreciate, introduction of a cycle into Ethernet network 100 will cause a packet storm and system failure. Such events can cause significant amounts of lost time, and consequently, in a corporate/business environment, lost productivity.

A common solution is to use Rapid Spanning Tree Protocol (RSTP). RSTP runs on each bridge and manages the state of ports based on link status and RSTP-specific packets called Bridge Protocol Units (BPDUs) that are exchanged between bridges. The copy of the RSTP on the bridge is known as an "instance." A network bridge is a network device that connects multiple network segments. For example CPU 102 can be designated a network bridge, even though it may perform other functions as well. Upon any change in the physical network topology (i.e., connecting or disconnecting a new component, such as an EP 112, or blade 114), the RSTP instance on each bridge enables and disables ports so as to build a tree which spans the network. A tree contains no cycles by definition, and so the Ethernet packet storm is avoided. This approach, however, is suitable for bridges that contain a single CPU and a single Ethernet switch. However, a problem arises when multiple CPUs and Ethernet switches are employed within the same product.

In FIG. 2, root node 202 (which can also be the main CPU), is connected to a plurality of bridges 204a-e via links 206a-f. An instance of RSTP is installed in root node 202. The resulting enabled and disabled links 206a-f will be chosen so as to minimize the total path cost from any node 204 to root node 202. The result is shown in FIG. 3. RSTP will then disable link 206c (indicated by broken line), so as to minimize the total path cost from any node to the root. Note that link 206d could also have been disabled, and the result would have been the same.

Nonetheless, while solving the problem of cycles, problems can arise from the application of RSTP in complex products. For example, in the configuration of FIG. 4, wherein node 204c is replaced by another CPU, i.e., a second "root node" 202b, and the six devices are split up as shown (i.e., first sub-network 402a and second sub-network 402b), with in-blades (204d, 204a) and out-blades (204e, 204b). Then, any communication from second root node 202b to node 204b needs to go from second sub-network 402b via node 204d, to first sub-network 402a and node 204e, then through first root node 202a, node 204a and then out of first sub-network 402a back to second sub-network 402b and node 204b, as indicated by arrow A. This is problematic because it will introduce unacceptable delays in communications between non-root main CPU 202b and out-blade/node 204b, as these communications will have to circumnavigate the entire network.

Furthermore, as those of skill in the art can appreciate, each CPU-Ethernet switch pair can be treated as a bridge, and therefore run as many instances of RSTP as there are CPUs in the system. The problem is that when multiple switches with this implementation are attached together, all but one of the switches configures itself in a state where Ethernet links within the system's Ethernet backbone are disabled and traffic within the system is forced to travel through peer systems, as shown in FIG. 4.

In addition, as those of skill in the art can appreciate, each link in an Ethernet network can be assigned a cost. The cost is proportional to the latency (high latency, high cost), and therefore inversely proportional to the bandwidth (low bandwidth, high cost). If a true minimum spanning tree were computed based on these link costs, then the problem could be solved by assigning a low cost to product-internal links. However, RSTP does not compute a true minimum spanning tree but rather computes the tree wherein each node has the minimum cost to an elected network root node. This is acceptable in fully hierarchical networks but breaks down for more complex scenarios which involve the use of multi-centered networks. In a multi-centered network topology (e.g., more main central processing units 102), link cost adjustment is not sufficient to prevent RSTP from breaking internal links.

Still further, stability is inversely related to bridge count. This means that after link state change, the time to convergence on a spanning tree increases, resulting in periods of either lost Ethernet connectivity or packet storms before the network stabilizes.

One potential solution to the problem with RSTP is to connect the Ethernet switches together using a technique called "trunking," under which the switches act as a single switch at the hardware level. The connection between the switches is then called a "network fabric." This solution has a severe limitation however: All Ethernet switches employed must have compatible trunking technology. Practically, this means using switches from the same product line and from the same manufacturer. This restriction is technically difficult to work with and is untenable in the long run for products that include lots of Ethernet devices, some of which might be located in different locations. As those of skill in the art can appreciate, the flexibility of using heterogeneous Ethernet switches is highly desired (because it allows for flexibility and cost efficiency). Consequently, the latencies and uncertainties introduced by the RSTP problem described above has made Ethernet connectivity to peer switches untenable for media switchers relying on Ethernet for interboard communications, pending a solution.

Thus, there is a need for improving the use of Ethernet networks in order to provide reliable network connectivity.

SUMMARY OF THE INVENTION

It is to be understood that both the general and detailed descriptions that follow are explanatory only and are not restrictive of the embodiments.

According to a first aspect of the embodiments an Ethernet network is provided, comprising one or more cascaded Ethernet devices, and a master Ethernet bridge that includes a master central processing unit (CPU) and associated master Ethernet switch, and one or more slave central processing units (CPU), each having an associated slave Ethernet switch, each of the associated slave Ethernet switches connected to a plurality of input/output ports (ports), and wherein each of the plurality of ports is assigned a respective port number, each of the ports being connected to one of the one or more cascaded Ethernet devices, and wherein, each of the master CPU and slave CPUs includes memory that contains a program that embodies a plurality of Ethernet functions adapted to substantially prevent re-routing of Ethernet commands by providing a mapping function that correlates the plurality of ports to respective ones of the one or more slave CPU and slave Ethernet switch.

According to the first aspect of the embodiments, the Ethernet functions comprise a Rapid Spanning Tree Protocol aggregate protocol slave (RAPSlave) function for each of the slave CPUs adapted to provide port activity information for respective ports attached to respective slave Ethernet switches, and a Rapid Spanning Tree Protocol aggregate protocol master (RAPMaster) function adapted to (a) receive the port activity information from each of the one or more RAPSlave functions, (b) perform a port number to blade and port mapping based on the received port activity information received from each of the RAPSlave function, and (c) provide the port activity information and the port mapping to an RSTP function. According to the first aspect of the embodiments, the RAPMaster function is further adapted to capture any Ethernet command from the RSTP function, map the received Ethernet command to the appropriate port, and forward the mapped Ethernet command to the appropriate RAPSlave of the appropriate slave CPU.

According to the first aspect of the embodiments, the RAPMaster and RAPSlave are further adapted to act as a transparent layer below the RSTP function, thereby allowing a single instance of the RSTP function to control the master Ethernet bridge. Still further according to the first aspect of the embodiments, the master CPU is part of a master digital media switch (MDMS) (502), and the slave CPU is part of a slave digital media switch (SDMS) (514), and further wherein the MDMS and the one or more of the SDMSs are part of a DM-MD64×64 64×64 DigitalMedia™ switcher built and sold by Crestron Electronics Inc.

According to the first aspect of the embodiments, one or more of the cascaded Ethernet devices can be a DM-MD64× 64 64×64 DigitalMedia™ switcher built and sold by Crestron Electronics Inc., and one or more digital media sinks connected to respective ports of the one or more cascaded Ethernet devices and master Ethernet bridge, one or more digital media sources connected to respective ports of the one or more cascaded Ethernet devices and master Ethernet bridge, and one or more digital media signal processors connected to respective ports of the one or more cascaded Ethernet devices and master Ethernet bridge.

According to a second aspect of the embodiments, an Ethernet bridge is provided, comprising a master central processing unit (CPU) and associated master Ethernet switch, and one or more slave central processing units (CPU) (505), each having an associated slave Ethernet switch, each of the associated slave Ethernet switches connected to a plurality of input/output ports (ports), and wherein each of the plurality of ports is assigned a respective port number, and wherein, each of the master CPU and slave CPUs includes memory that contains a program that embodies a plurality of Ethernet functions adapted to substantially prevent re-routing of Ethernet commands by providing a mapping function that correlates the plurality of ports to respective ones of the one or more slave CPU and slave Ethernet switch.

According to the second aspect of the embodiments, the Ethernet functions comprise a Rapid Spanning Tree Protocol aggregate protocol slave (RAPSlave) function for each of the slave CPUs adapted to provide port activity information for respective ports attached to respective slave Ethernet switches, and a Rapid Spanning Tree Protocol aggregate protocol master (RAPMaster) function adapted to (a) receive the port activity information from each of the one or more RAPSlave functions, and (b) perform a port number to blade and port mapping based on the received port activity information received from each of the RAPSlave function, and (c) provide the port activity information and the port mapping to an RSTP function.

According to the second aspect of the embodiments, the RAPMaster function is further adapted to capture any Ethernet command from the RSTP function, map the received Ethernet command to the appropriate port, and forward the mapped Ethernet command to the appropriate RAPSlave of the appropriate slave CPU.

According to the second aspect of the embodiments, the RAPMaster and RAPSlave are further adapted to act as a transparent layer below the RSTP function, thereby allowing a single instance of the RSTP function to control the master Ethernet bridge, and the master CPU is part of a master digital media switch (MDMS) (502), and the slave CPU is part of a slave digital media switch (SDMS) (514), and further wherein the MDMS and the one or more of the SDMSs are part of a DM-MD64×64 64×64 DigitalMedia™ switcher built and sold by Crestron Electronics Inc.

According to the second aspect of the embodiments, one or more of the cascaded Ethernet devices can be a DM-MD64×64 64×64 DigitalMedia™ switcher built and sold by Crestron Electronics Inc., and the Ethernet bridge is part of an Ethernet network (500) that comprises one or more digital media sinks connected to respective ports of the one or more cascaded Ethernet devices and master Ethernet bridge, one or more digital media sources connected to respective ports of the one or more cascaded Ethernet devices and master Ethernet bridge; and one or more digital media signal processors connected to respective ports of the one or more cascaded Ethernet devices and master Ethernet bridge.

According to a third aspect of the embodiments a method for processing Ethernet commands in a master Ethernet bridge that is part of an Ethernet network is provided, the method comprising receiving a plurality of port activity information at a second Ethernet function from a first Ethernet function; and using the received plurality of port activity information by the second Ethernet function to create a map of a plurality of ports in the master Ethernet bridge.

According to the third aspect of the embodiments, the port activity information represents a level of activity on a respective port that is part of the master Ethernet bridge, and further wherein the port activity information contains a port number that represents a location within the master Ethernet bridge, and the location associated with a portion number represents a particular input/output port (port) of a particular one or N blades of the master Ethernet switch, wherein each of the one of N blades includes a slave central processing unit and associated slave Ethernet switch, such that the mapping in the second Ethernet function correlates a port number to a blade number and associated blade port number.

According to the third aspect of the embodiments, the method further comprises receiving an Ethernet command at the second Ethernet function from the first Ethernet Function, wherein the first Ethernet function provides the Ethernet command to the first Ethernet function with an associated port number, forwarding the receiving Ethernet command from the second Ethernet function to a third Ethernet function, processing the forwarded Ethernet command by the third Ethernet function, receiving the processed Ethernet command at the second Ethernet function from the third Ethernet function, mapping the received Ethernet command by the second Ethernet function such that the received Ethernet command can be sent to an intended blade and associated blade port, and forwarding the received and mapped Ethernet command to the appropriate blade and associated blade port that corresponds to the associated port number.

According to the third aspect of the embodiments, the first function is a rapid spanning tree protocol (RSTP) aggregate protocol slave function associated with one of plurality of blades of a master Ethernet bridge device, the second function is an RSTP aggregate protocol (RAP) master function associated with a master central processing unit (CPU) of the master Ethernet bridge device, and the third function is an RSTP function associated with the master CPU of the master Ethernet bridge device.

According to a fourth aspect of the embodiments, a functional distribution of Ethernet functions within a master Ethernet bridge is provided, the master Ethernet bridge including a plurality of blades and ports associated with respective blades, the blades including a slave central processing unit and associated slave Ethernet switch, and further including a master CPU and associated master Ethernet switch, the functional distribution of Ethernet functions comprising a rapid spanning tree protocol (RSTP) Ethernet function located within the master CPU and adapted to enable and disable ports on the master Ethernet bridge, a plurality of RAP slave Ethernet functions located on respective ones of the plurality of slave CPUs and adapted to generate port activity information for each of the ports associated with the blade and the RAP slave Ethernet function, and an RSTP aggregate protocol (RAP) master Ethernet function located within the master CPU and adapted to (a) receive the generated port activity information from each of the plurality of RAP slave Ethernet functions, (b) create a map of the master Ethernet bridge that correlates a port number to a blade number and associated blade port number using the received port activity information from each of the plurality of RAP slave functions, (c) transmit and receive Ethernet commands to and from the RSTP Ethernet function, and (d) map Ethernet commands received from the RSTP Ethernet function to the correct blade and port of the blade using the created map of the Master Ethernet bridge.

DISCLOSURE OF INVENTION

The aspects of the embodiments described herein seek to overcome or at least ameliorate one or more of several problems, including but not limited to cycling, packetstorms, and the like, in Ethernet networks, and provide the benefits of improving network stability, and substantially preventing internal connectivity losses.

BRIEF DESCRIPTION OF THE DRAWINGS

The above and other objects and features of the embodiments will become apparent and more readily appreciated from the following description of the embodiments with reference to the following figures. Different aspects of the embodiments are illustrated in reference figures of the drawings. It is intended that the embodiments and figures disclosed herein are to be considered to illustrative rather than limiting. The components in the drawings are not necessarily drawn to scale, emphasis instead being placed upon clearly illustrating the principles of the aspects of the embodiments. In the drawings, like reference numerals designate corresponding parts throughout the several views.

BRIEF DESCRIPTION OF THE SEVERAL VIEWS OF THE DRAWING

FIG. 1 illustrates a conventional Ethernet network.
FIG. 2 illustrates a cycle in a conventional Ethernet network.

FIG. 3 illustrates the block diagram of FIG. 2 with RSTP installed therein.

Figure 4:
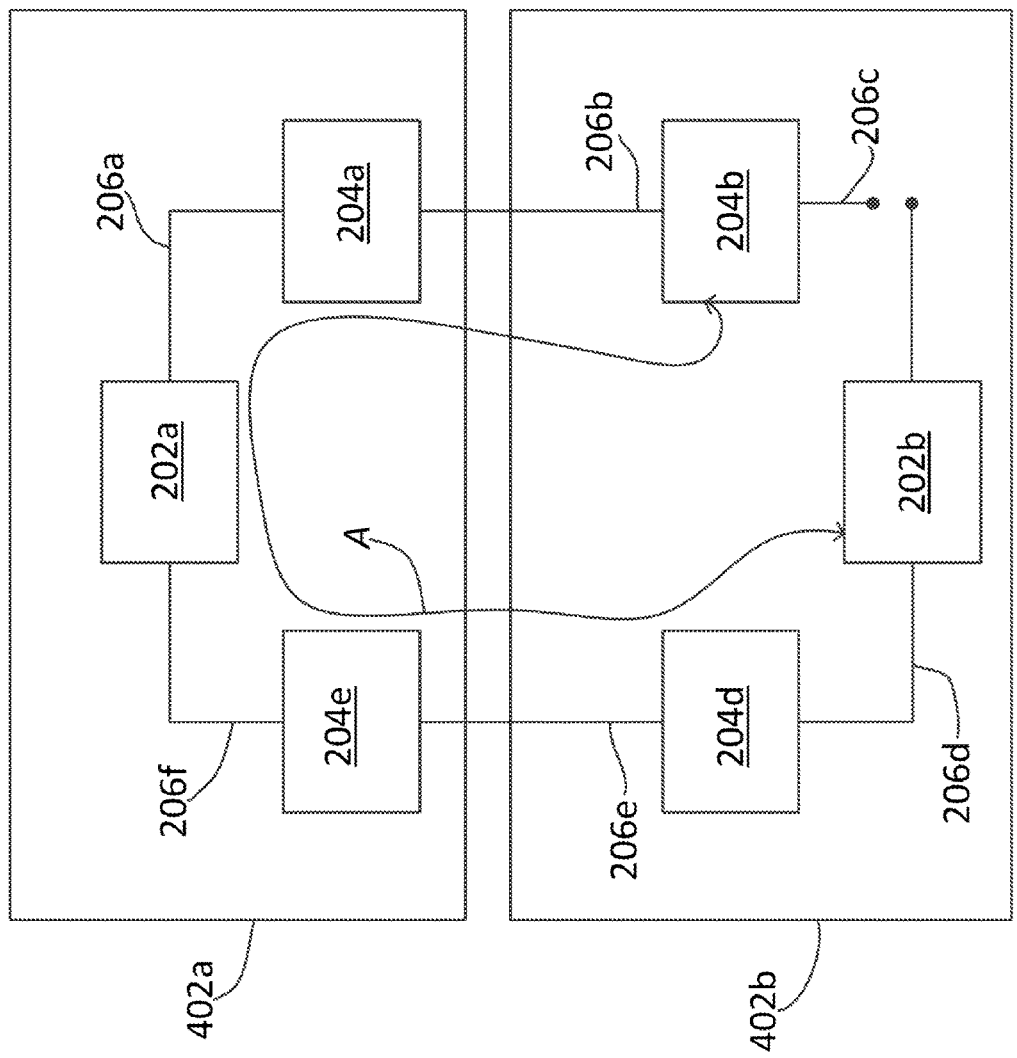

FIG. 4 illustrates the block diagram of FIG. 3 with two nodes representing different products, showing a product-internal link shutdown due to RSTP.

Figure 5:
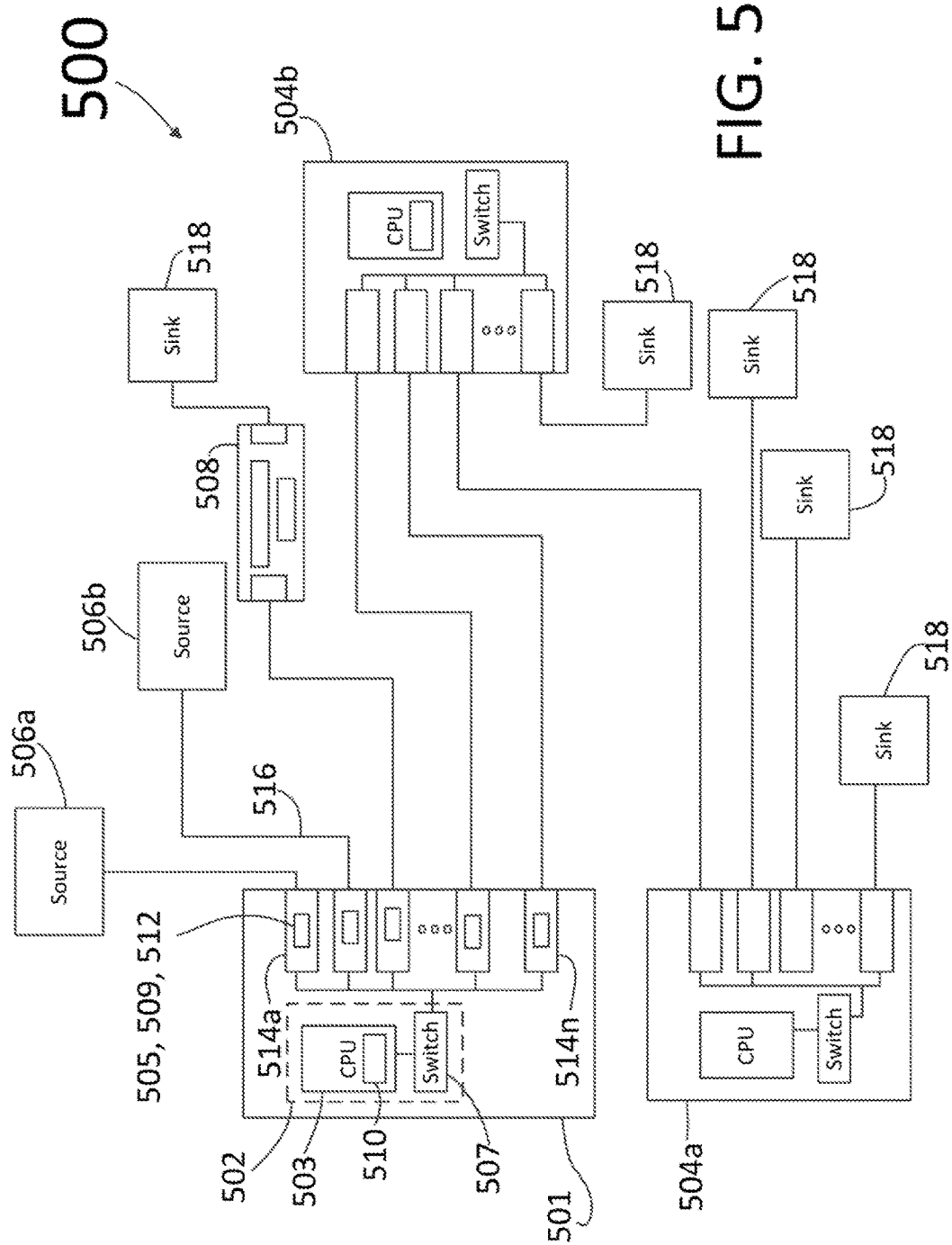

FIG. 5 illustrates an Ethernet RSTP aggregation network for distributing media data according to an embodiment.

Figure 6:
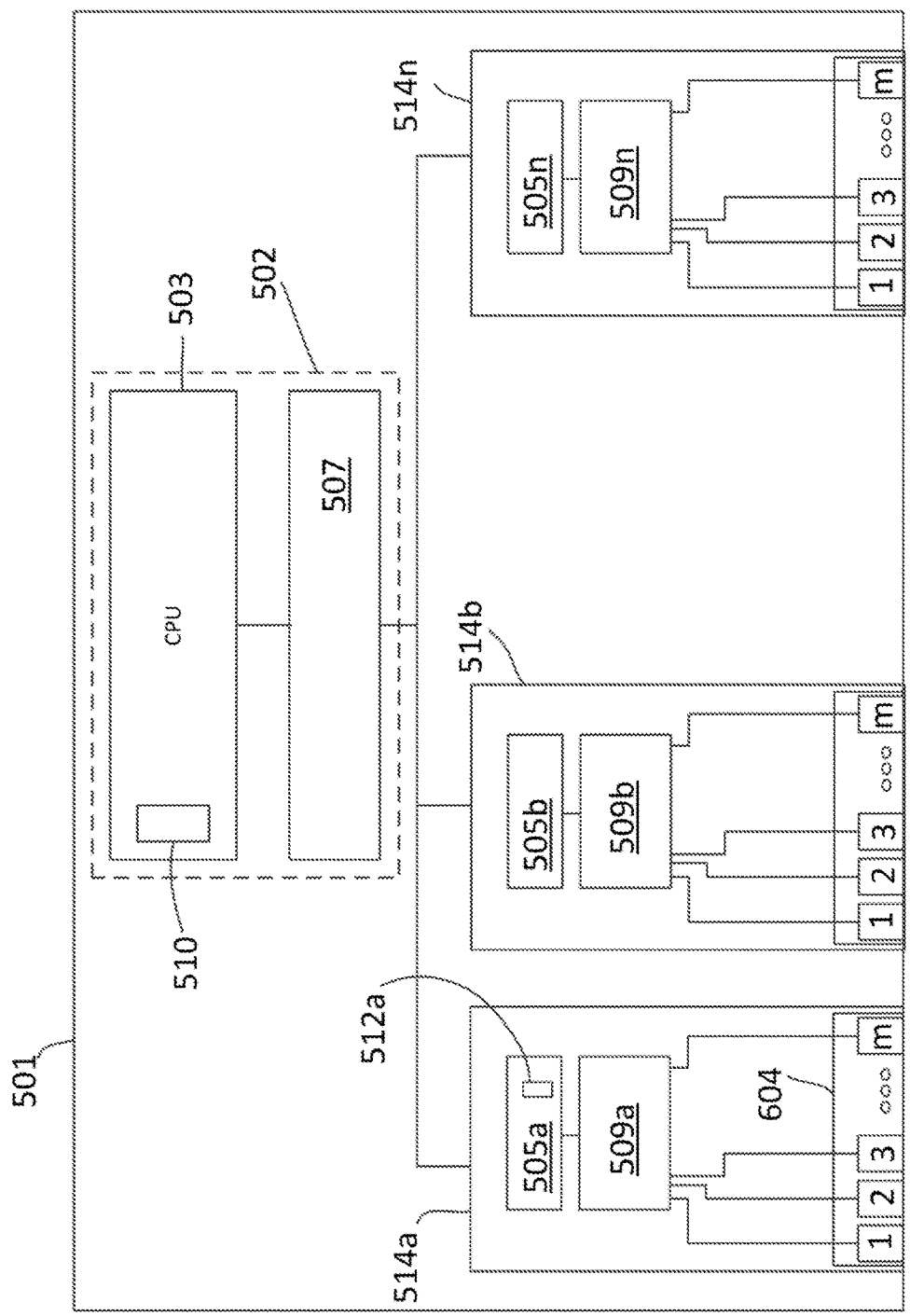

FIG. 6 illustrates an RSTP Master Digital Media Switch/Slave Digital Media Switch according to an embodiment.

Figure 7:
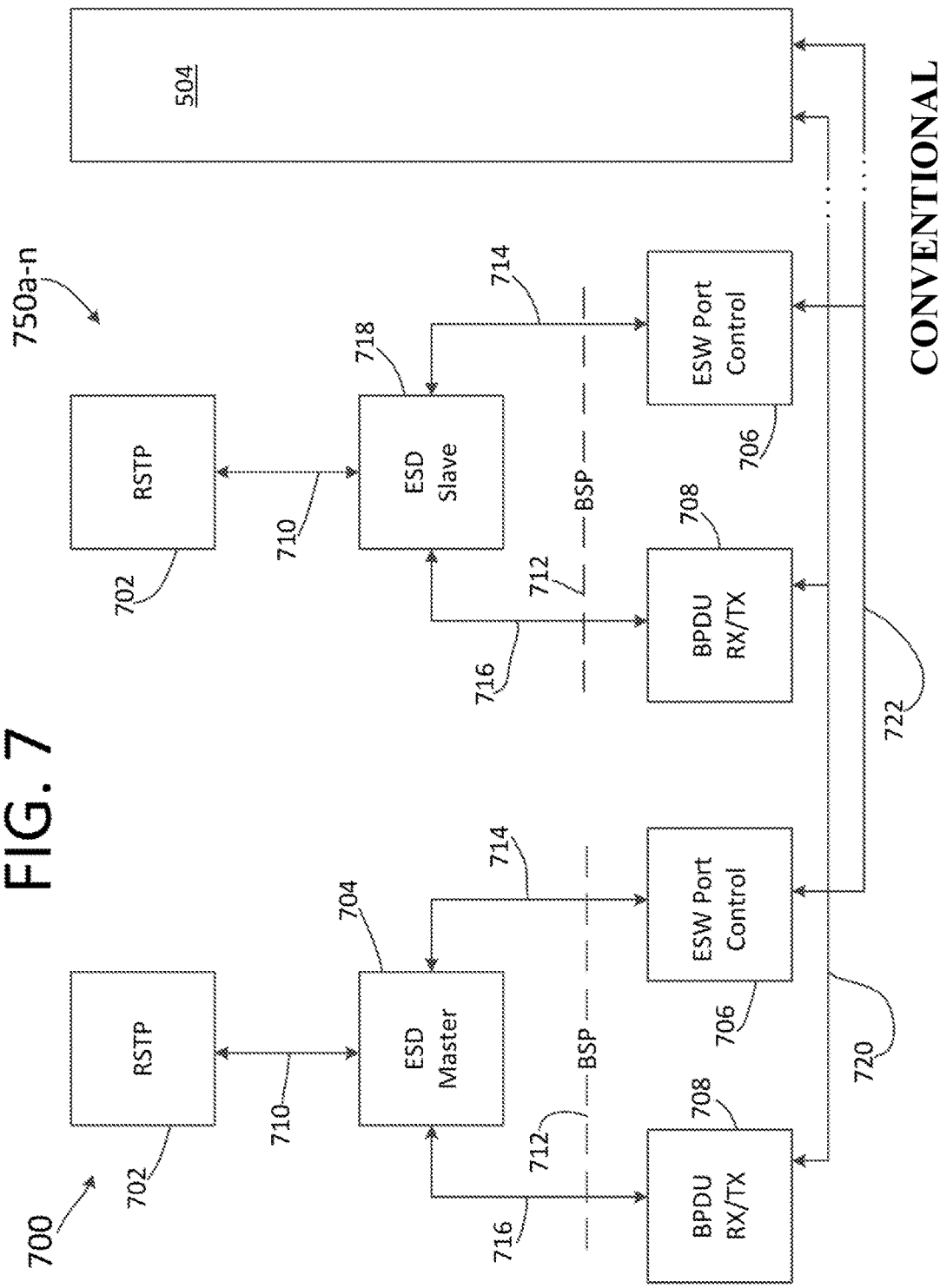

FIG. 7 illustrates the software architecture of RSTP in a multi-CPU product prior to the introduction of RAP according to an embodiment.

Figure 8:
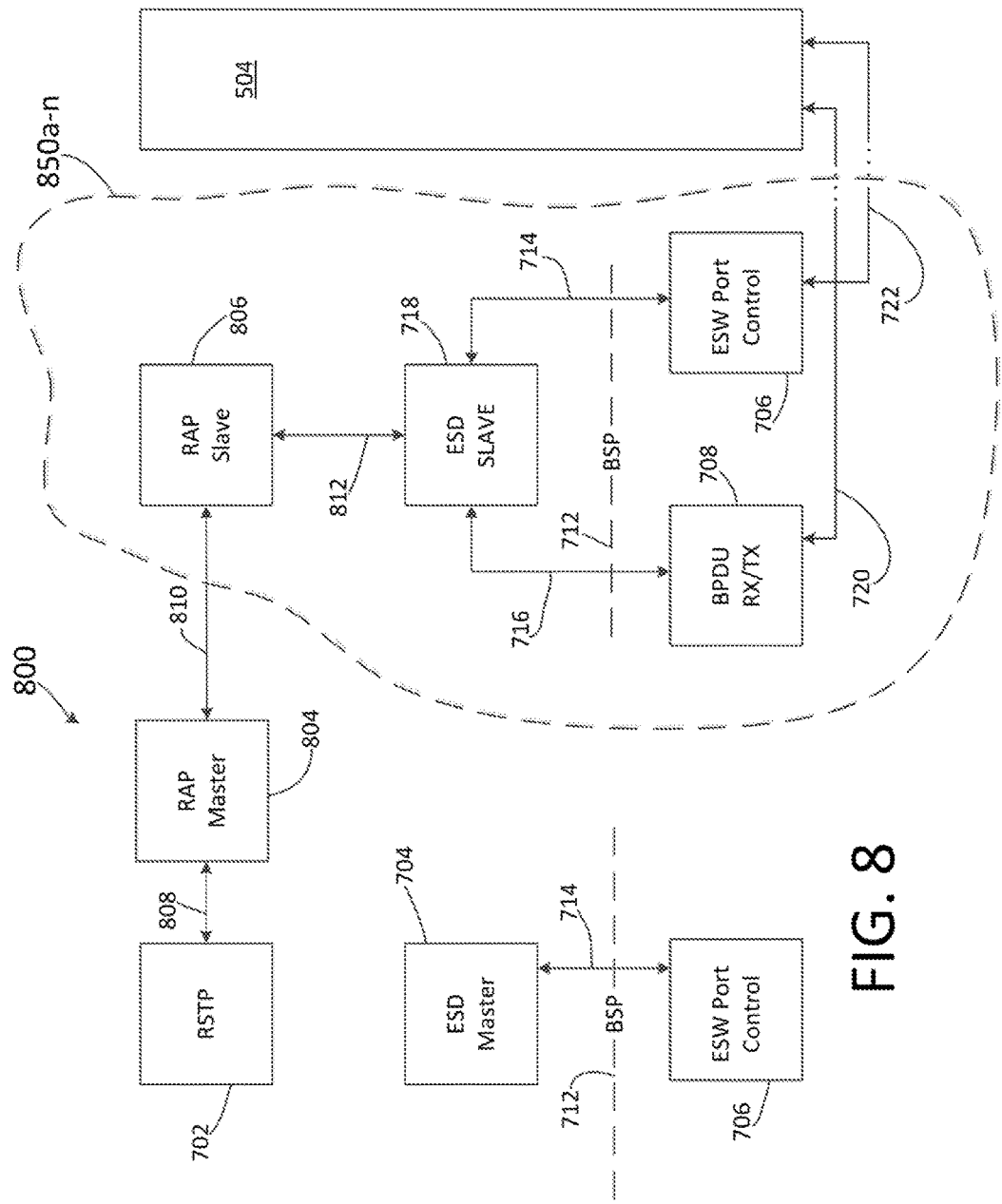

FIG. 8 illustrates a full implementation of a distribution of Ethernet functions and interfaces, including a master RSTP aggregation protocol function, in an MDMS, and a slave RSTP aggregation protocol function in an SDMS, within application and transport layers according to an embodiment.

Figure 9:
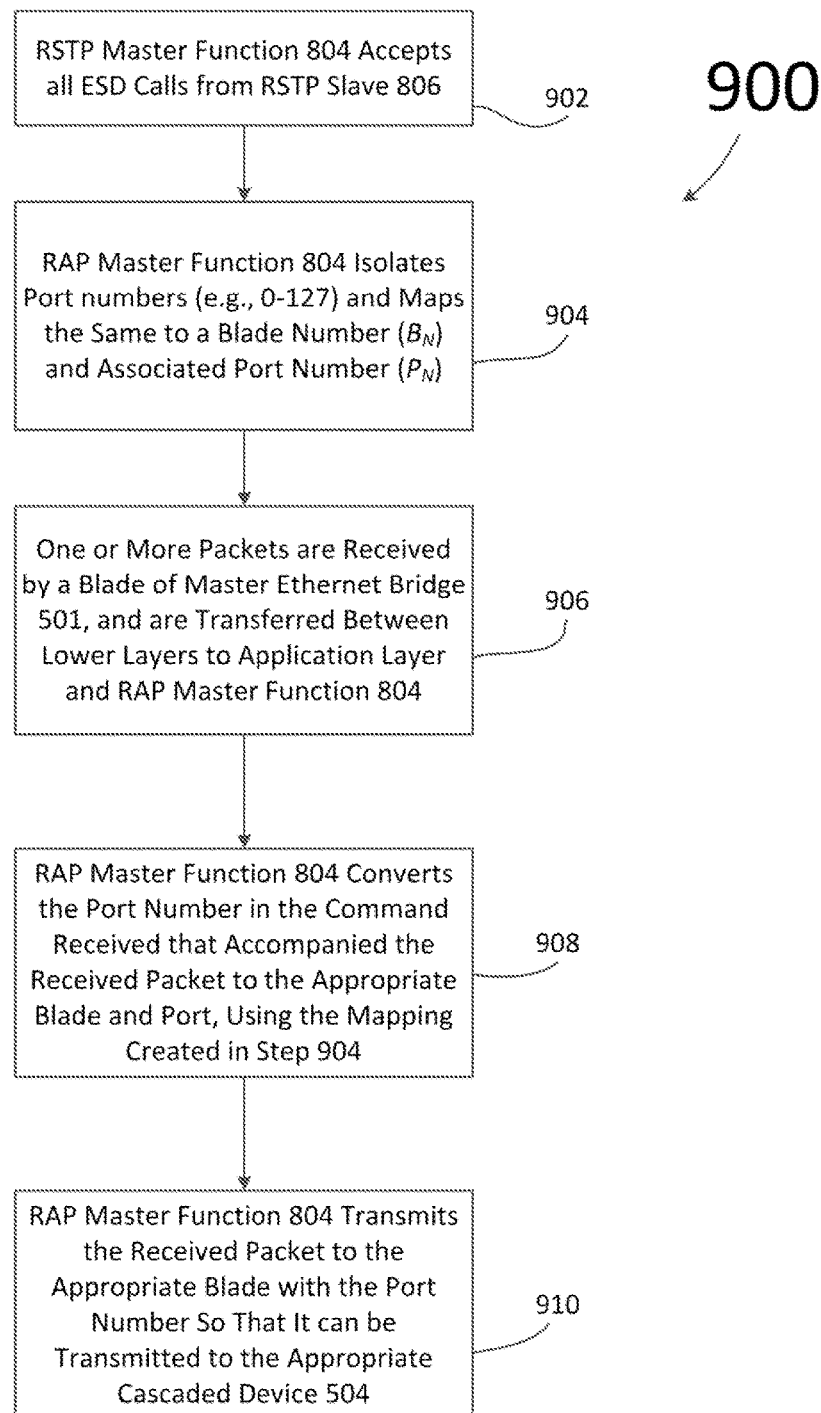

FIG. 9 illustrates a flow chart of a method for implementing an RSTP aggregation protocol according to an embodiment.

LIST OF REFERENCE NUMBERS FOR THE MAJOR ELEMENTS IN THE DRAWINGS

The following is a list of the major elements in the drawings in numerical order.
100 Ethernet Network
102 Main Central Processor Unit (CPU)
104 Central Processing Unit (CPU) Input/Output (IO)
106 Communication Paths
112 End Points (EP) (video sinks and video sources)
114 Blades/1:n multiplexors
120 Additional Ethernet Network
202 Root Node
204 Bridge
402 Sub-network
500 Ethernet RSTP Aggregation (ERA) Network
501 Master Ethernet Bridge
502 Master Digital Media Switch (MDMS)
503 MDMS Central Processor Unit
504 Cascaded Ethernet Device
505 SDMS Central Processor Unit
506 Media Source
507 Master Ethernet Switch
508 Media Signal Processor
509 Slave Ethernet Switch
510 RSTP Aggregate Master Protocol (RAMP) Software
512 RSTP Aggregate Slave Protocol (RASP) Software
514 Slave Digital Media Switch (SDMS) (Blade)
516 Ethernet Segment
518 Media Sink (VCR; TV: Stereo, among others)
602 Blade CPU
604 Blade I/O
606 RAN Switch CPU
700 Master Ethernet Function Architecture
702 RSTP Function
704 ESD Master Function
706 ESW Port Control Function
708 BPDU Rx/Tx Function
710 RSTP-ESD Interface
712 BSP Function
714 ESD-ESW Interface
716 ESD-BPDU Interface
718 ESD Slave Function
720 BPDU Inter-Board Interface
722 ESW Port Control Inter-Board Interface
750 Slave Ethernet Function Architecture
800 Master RAP Ethernet Function Architecture—MDMS
804 RAP Master Function
806 RAP Slave Function
808 RSTP-RAP Master Interface
810 RAP Master-RAP Slave Interface
812 RAP Slave-SDMS ESD Interface
850 Slave RAP Ethernet Function Architecture-SDMS

DETAILED DESCRIPTION OF THE INVENTION

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims. The detailed description that follows is written from the point of view of a control systems company, so it is to be understood that generally the concepts discussed herein are applicable to various subsystems and not limited to only a particular controlled device or class of devices, such as motorized roller shades.

Reference throughout the specification to "one embodiment," or "an embodiment," means that a particular feature, structure, or characteristic described in connection with an embodiment is included in at least one embodiment of the embodiments. Thus, the appearance of the phrases "in one embodiment" on "in an embodiment" in various places throughout the specification is not necessarily referring to the same embodiment. Further, the particular feature, structures, or characteristics may be combined in any suitable manner in one or more embodiments.

The different aspects of the embodiments described herein pertain to the context of an Ethernet network system, but is not limited thereto, except as may be set forth expressly in the appended claims.

FIG. 5 illustrates Ethernet RSTP aggregation network (ERA network) 500 for distributing media data according to an embodiment. As those of skill in the art can appreciate, media data in regard to Ethernet networks comprises digital data only; however, in view of the use of the aspects of the embodiments, the data transferred by Ethernet networks as described herein will continue to be referred to as "digital media" or "media." Aspects of the embodiments provide systems, methods, and devices for distributing media over an Ethernet network (ERA network 500) comprising one or more devices, each with one or more CPUs, and further comprising one or more Ethernet switches (or also known as Ethernet "switchers"). As those of skill in the art can appreciate, an Ethernet switch or switcher is configured to route Ethernet encoded packets of data (data can mean commands, or can mean actual data, e.g., encoded documents) from one place to another, using the well-known and well-established Ethernet protocols that are substantially ubiquitous in current networking environments.

According to an embodiment, master digital media switch (MDMS) 502 and slave digital media switch (SDMS) 514, within master Ethernet bridge 501, acts as a single bridge through the use of an RSTP aggregation protocol (RAP).

The other devices, including cascaded devices 504, implement conventional RSTP. According to an embodiment, a new protocol (i.e., a set of rules as defined in an application according to an embodiment) is provided for communicating between the plurality of CPUs within MDMS 502 and which herein is called an RSTP Aggregation Protocol (RAP). There are at least two different versions of RAP as embodied as a modified RSTP application, or "App": a master App, and a slave App. Those of skill in the art can appreciate that another way of treating the modified RSTP application is to consider it as a single protocol that can operate in two directions (master-to-slave, and slave-to-master) and with two different types of packets. The master RSTP App is referred to as RSTP aggregation protocol master (RAPMaster), and is embodied as RSTP aggregate master protocol (RAMP) software 510, and the slave RSTP App is referred to as RSTP aggregation protocol slave (RAPSlave), and is embodied as RSTP aggregate slave protocol (RASP) software 512.

MDMS 502 includes MDMS CPU 503, which contains or has access to memory that stores RAMP software 510 according to an embodiment. MDMS 502 further includes master Ethernet switch 507. SDMS 514 includes SMDS CPU 505, which contains or has access to memory that stores RASP software 512 according to an embodiment. All of the other switches or cascaded devices 504 of ERA network 500 contain conventional RSTP software.

According to an embodiment, RAPMaster App and RAPSlave App, embodied as RAMP software 510 and RASP software 512, respectively, causes master Ethernet bridge 501 to emulate a single Ethernet switch even though there can be as many as 32 separate SDMSs 514 and one MDMS 502 in master Ethernet bridge 501. The RAPSlave App interfaces with the peripheral Ethernet switches of cascaded devices 504 and exchanges information with the MDMS CPU 503 and RAPMaster via RAP. According to an embodiment, therefore, RAP is a protocol that provides for tunneling of BPDUs, link status information, and port state change commands, all of which is sent to the RAPMaster App that is used by MDMS CPU 503 so that it, and it alone, can determine and track the topology of master Ethernet bridge 501 and the plurality of cascaded devices 504 attached to it. According to an embodiment, therefore, the internal Ethernet backbone between and amongst MDMS 502, SMDS 514a-n, and cascaded devices 504 is protected and is not cut under any circumstances. Accordingly, both inter- and intra-board traffic within master Ethernet bridge 501 always flows, and enjoys the low latency and high bandwidth provided by the Ethernet backbone, as if in its original, unaltered state. This, as those of skill in the art can appreciate, causes all of the Ethernet traffic within ERA network 500 to flow better as described above. According to a further embodiment, use of ERA network 500 and the RAP App (RAMP software 510 and RASP software 512) has the effect of reducing the number of bridges in the entire Ethernet network. The practical result is that the network responds more quickly to topology changes.

ERA network 500, as shown in FIG. 5, is adapted to distribute media data according to an embodiment. ERA network 500 comprises a plurality of Ethernet controlled media switchers in a cascaded setup (i.e. a first Ethernet media switcher is in communication with another Ethernet media switcher, and so on). ERA network 500 can be employed in a single building, or can be distributed throughout a number of buildings, such as on a corporate campus.

As described above, and as shown in FIGS. 5 and 6, MDMS 502 includes master Ethernet switch 507 that controls a plurality of RSTP aggregation network (RAN) blades—now referred to as slave digital media switchers (SDMSs) 514a-n. According to embodiments, each of MDMS 502 and SDMS 514 can be 8×8, 16×16, 32×32, 64×64, or 128×128 switches, meaning, in the first case, 8 input ports multiplexed to 8 output ports, and in the last example, 128 inputs are multiplexed to 128 outputs. As those of skill in the art can appreciate, each input can be multiplexed to any one or all of each outputs; further, each of the inputs could be receiving media and each output port could have media multiplexed to it and then to the media sinks attached to the output ports. As those of skill in the art can appreciate, however, the audio/video routing paths are independent of the Ethernet paths.

Further shown in FIG. 5 are media sources 506, each of which can provide its own unique media signal to one or more input ports on either MDMS 502 or SDMS 504. Ethernet segment 516 connects the input ports and output ports to media sources and sinks, respectively, and further shown is media signal processor 508, which can be an amplifier/extender, filter, or any other type of device that processes media signals before it is received by media sink 518.

It can be readily understood that, as shown in FIG. 5, the problems discussed above with RSTP protocols can readily occur with the cascaded environment of ERA network 500 but for the presence and operation of the RSTP aggregation protocol (RAP) as embodied as RAMP software 510 and RASP software 512. It can further be understood that current users of ERA networks 500 expect substantially error free performance, and want their Ethernet networks to run without errors, including the packet storms that can lead to system failures, especially in corporate environments, in which any downtime is poorly tolerated, and which can quickly negatively affect throughput.

As shown in FIG. 5, master digital media switch (MDMS) 502 contains MDMS CPU 503, which itself either contains, and can access, internal/external memory, and in which resides RSTP aggregate master protocol (RAMP) software 510. It is RAMP software 510 in MDMS CPU 503 that causes MDMS 502 to be the master CPU in ERA network 500 that provides for tunneling of BPDUs, link status information, and port state change commands, so that MDMS 502 can determine and track the topology of ERA network 500 according to an embodiment. In terms of just the hardware that makes up MDMS 502, SDMS 514, and the similar portions of cascaded devices 504, however, there is no substantial difference these devices. Because of the capabilities and design of RAMP software 510 and RASP software 512 any device, including the plurality of cascaded devices 504 is inter-operable with standard RSTP products in a larger Ethernet network. This allows for backwards compatibility into existing customer networks without significant support problems. Those of skill in the art can appreciate that Ethernet is embodied in both hardware and software, meaning that particular physical devices need to exist in a switch for it to operate as an Ethernet switch, but there also must specific software protocols, or programs, that control different aspects of the Ethernet protocols, including the handling of hardware.

FIG. 6 illustrates a detailed view of master Ethernet bridge 501 according to an embodiment. Master Ethernet bridge 501 includes MDMS 502, which itself contains MDMS CPU 503, which comprises, or has access to, memory. In that memory will be stored, in the case of MDMS 502, RAMP software 510. Each of SDMSs 514a-n includes SDMS CPU 505 that includes or has access to memory that stores and runs RASP software 512. Each SDMS 514 contains slave Ethernet switch 509, which, in conjunction with its respective SDMS CPU 505, controls the input-output flow of media into and out of SDMSs 514*a-n* according to further aspects of the embodiments.

Each of SDMSs 514 can contain 1-m Ethernet interfaces with media sources/sinks. In typical configurations, "m" equals 8, so that each of SDMSs 514 can include 8 inputs or outputs of media data. As described above, each of master Ethernet bridge 501 and cascaded devices 504 can be configured as an 8×8 (8 inputs, 8 outputs), 16×16 (16 inputs, 16 outputs), 32×32 (32 inputs, 32 outputs), 64×64 (64 inputs, 64 outputs), or 128×128 (128 inputs, 128 outputs). In the case of master Ethernet bridge 501, a 128×128 switcher would comprise 16 SDMSs 514(1)-514(16) configured to operate as 128 inputs (8×16=128), and 16 SDMSs 514(17)-(32) configured to operate as 128 outputs.

Attention is now directed towards FIG. 7, which illustrates an implementation of a conventional Ethernet function architecture as can be found in each of cascaded devices 504. The conventional Ethernet function architecture can be divided into master Ethernet function architecture 700 that operates in the master CPU board of cascaded devices 504, and slave Ethernet function architecture 750 that operates in the slave CPU boards (blades 114) of cascaded devices 504.

In master Ethernet function architecture 700 the distribution of functions is as follows: In the application layer there is RSTP 702 and Ethernet Switch Driver (ESD) master 704, and in the lower layers there is board support package (BSP) 712, BPDU receive and transmit 708, and Ethernet switch (ESW) port control 706. Most Ethernet switch functions occur through the ESD hardware application layer, between ESW port control function 706, and via ESD-ESW interface 714. In addition, BPDU RX/TX function 708 communicates with RSTP function 702 using separate calls via BPDU-ESD interface 716 and RSTP-ESD interface 710.

Most of the Ethernet functions are the same in the slave CPU boards, with the exception of ESD slave 718 taking the place of ESD master in the application layer of the slave CPU board. Thus, slave Ethernet function architecture 750 comprises the following: In the application layer there is RSTP 702 and Ethernet Switch Driver (ESD) slave 718, and in the lower layers there is board support package (BSP) 712, BPDU receive and transmit 708, and Ethernet switch (ESW) port control 706. As in master Ethernet function architecture 750, most Ethernet switch functions occur through the ESD hardware application layer, between ESW port control function 706, and via ESD-ESW interface 714. In addition, BPDU RX/TX function 708 communicates with RSTP function 702 using separate calls via BPDU-ESD interface 716 and RSTP-ESD interface 710. The BPDU RX/TX functions 708 in both the master and slave Ethernet function architectures 700, 750 communicate via BPDU inter-board interface 720, and this extends to blades 114 in cascaded devices 504. The ESW port control functions 706 in both the master and slave Ethernet function architecture 700, 750 communicate via ESW port control inter-board interface 722, and this also extends to blades 114 in cascaded devices 504. It should be apparent by those of skill in the art that "inter-board" does not necessarily mean between two separate devices; indeed, the implementation of the Ethernet functions 700, 750*a-n*, as shown in FIG. 7, exist within one device, for example a digital media 128×128 Ethernet switcher wherein "a-n" represents 1-32 (16 multiplexed input switchers of 8 input ports each, and the same for the output ports).

Each of the plurality of cascaded systems 504 shown incorporates the master and slave Ethernet function architectures 700, 750*a-n*. The Ethernet function distributions of FIG. 7 provides for communication between RSTP implementations by the BPDU RX/TX functions 708 and BPDU inter-board interface 720, and link status changes that are communicated by ESW port control inter-board interfaces 722.

Attention is now directed towards FIG. 8, which illustrates an implementation of RSTP aggregation protocol (RAP) Ethernet function architecture as can be found in master Ethernet bridge 501 according to an embodiment. RSTP RAP Ethernet function architecture can be divided into master RAP Ethernet function architecture 800 that operates in MDMS CPU 503 of master Ethernet bridge 501, and slave RAP Ethernet function architecture 850 that operates in one or more of SDMS CPU 505 of master Ethernet bridge 501 according to an embodiment. Also shown in FIG. 8 are cascaded devices 504, each of which contains conventional RSTP Ethernet function architecture, and which, as described above, can be divided into master Ethernet function architecture 700 that operates in the master CPU board of cascaded devices 504, and slave Ethernet function architecture 750 that operates in the slave CPU boards (blades 114) of cascaded devices 504

As with the conventional Ethernet function architecture shown in FIG. 7, RAP Ethernet function architecture distributes the Ethernet functions and interfaces according to aspects of the embodiments, including master RAP Ethernet function architecture 800 in MDMS CPU 503 of MDMS 502, and slave RAP Ethernet function architecture 850 in each of SDMS CPU 509*a-n* of SDMS 514, respectively, within application and transport layers, according to an embodiment. As those of skill in the art can appreciate, a quick comparison between the Ethernet functional architecture block diagrams of FIG. 8 and that of FIG. 7 illustrates that several Ethernet functions have been added, interfaces removed and new ones inserted, and at least one Ethernet function has been removed or modified in accordance with aspects of the embodiments.

For example, master RAP Ethernet function architecture 800 includes RAP Master Function 804, RSTP-RAP Master Interface 808, and RAP Master-RAP Slave Interface 810, all of which are now located in the application layer, and that BPDU RX/TX 708 has been eliminated in the lower layers, and its functionality moved to the application layer as RAP Master-RAP Slave Interface 810 according to an embodiment.

Further still, it can be appreciated by those of skill in the art that cascaded systems 504 contain conventional RSTP protocols. According to aspects of the embodiments, therefore, the full implementation of a distribution of Ethernet functions and interfaces that includes master RAP function 804 and slave RAP function 806 ensures continuity of the Ethernet backbone within each system in a cascaded setup.

For purposes of the following discussion, which includes a description of different aspects of the embodiments to implement master RAP Ethernet function architecture 800 and slave RAP Ethernet function architecture 850 as illustrated in FIG. 8 to substantially eliminate or prevent the problems that exist in the prior art described above including, for example, cycles and packet storms, reference will be made simply to the architectures shown in FIG. 8 as the "Ethernet RSTP Aggregation Protocol (RAP)."

Ethernet RAP, as embodied as RAMP software 510 and RASP software 512 according to aspects of the embodiments, determines the number of blades/ports on master Ethernet bridge 501 according to the following process. Each time a new SDMS 514 is inserted into master Ethernet bridge 501 and connected to MDSM 502, or is powered up, a plurality of commands in the RAP protocol are sent from the slave to the master reporting that a new blade is connected. In this portion of the discussion, it is to be understood that "blade" refers to SDMS 514 and port is one of the input/output interfaces 1–M of each blade/SDMS 514. As those of skill in the art can appreciate, however, the number of ports is fixed based on the particular product line (e.g., 8 ports per slave in the case of a Crestron DM64×64 product). As those of further skill in the art can appreciate, in Ethernet all ports are bidirectional. According to an aspect of the embodiments, the functionality of RAP is isolated to the internals of master Ethernet bridge 501. The interaction with other cascaded devices 504 continues to use conventional RSTP protocol, but with the benefit that master Ethernet bridge 501 employing RAP appears as a single RSTP bridge rather than a plurality of bridges. The resulting network is therefore, according to aspects of the embodiments, much more stable.

In the following discussion, according to an embodiment, master Ethernet bridge 501 is a 64×64 Ethernet switching device. As those of skill in the art can appreciate, however, the aspects of the embodiments are not limited to any particular configuration of input/output ports (e.g., the principles equally apply to an 8×8, 128×128, and so on), and the use of a 64×64 Ethernet switching device is simply for purposes of discussion, and is not to be taken in a limiting manner.

FIG. 9 illustrates a flow chart of method 900 for implementing an RSTP aggregation protocol according to an embodiment. According to method 900, Ethernet RAP works as follows. In step 902, RAP Master function 804 accepts all ESD calls (e.g., GetLinkStatus, SetRstpState, SendBPDU, ReceiveBPDU, among others) from RAP slave 806 via RSTP Master-RSTP Slave interface 810. RAP master function 804 then translates a system port number 0-127 into a blade number, $B_N$, and port number, $P_N$, on that blade in method step 904; this is also referred to as a mapping function. That is, Ethernet RAP creates a table of the following:

TABLE 1

| System Port Number (for a 64 × 64 Ethernet Switch) | BN, PN |
|---|---|
| 000 | 0, 0 |
| 001 | 0, 1 |
| 002 | 0, 2 |
| 003 | 0, 3 |
| . | |
| . | |
| . | |
| 125 | 7, 5 |
| 126 | 7, 6 |
| 127 | 7, 7 |

According to an embodiment, the mapping function of method step 904 can be defined in a product-specific configuration file. That is, RAP master 804 has a unique portion dependent on the particular configuration of the Ethernet product within which it is located in (e.g., a 64×64 product will have a different configuration file than a 128×128 product. The translation occurs within RAPMaster 804 according to an embodiment, which, upon receiving a command from the RSTP instance for a specific port number, matches or maps that port number to a specific blade and blade-port-number to send the command to. RAPSlave 806 will receive and carry out the command on its Ethernet switch (i.e., the particular blade, or SDMS 514 to which it is associated with). The reverse translation occurs, once again inside RAPMaster 804, upon receiving messages from RAPSlave 806 for respective ones of SDMAs 514. In this manner, Ethernet RAP maps all of the blades (SDMS 514) and ports (up to 8 ports for each SDMS (blade) 514), such that it now knows which blades exist, which ports are active, and what is connected to each of them.

The mapping function occurs by RAPMaster 804 knowing, through the configuration file described above, the potential number of blades and ports, but assumes that actually no blades are active. When a new blade (SDMS 514) comes online, RAPslave 806 for the particular blade sends periodic heartbeat packets to RAPMaster 806. Upon receiving a heartbeat (or any other) packet from a respective blade, RAPMaster 804 knows that that blade is active, and so marks the blade as active in memory. Via a timeout mechanism, RAPMaster 804 will "forget" a blade if it does not receive any packets from that blade after a specified period of time (3 heartbeat periods). Thus RAPMaster tracks the on and off states of each blade (SDMS 514) according to an embodiment. In regard to the individual port states, the blades send a STATUS packet containing the port status information. Those of skill in the art can appreciate that a more complete discussion of how the STATUS packets are received and processed are not needed to understand the aspects of the embodiments, and therefore, in fulfillment of the dual purposed of clarity and brevity, a detailed discussion of the same can be omitted. In method step 906, RAP master function 804 and RSTP function 702 receive a packet that is sent from a first cascaded device 504a (or master Ethernet bridge 501) to a second intended cascaded device 504b that is initially directed to a system port, but can now be directed to a particular blade/port, $B_N$, $P_N$, using the mapping function determined in method step 904, and as shown in Table 1. In method step 908, RAP master function 804 then sends the received packet to RAP Slave 806 on the appropriate blade and port, according to the command received that accompanies the packet to be transmitted. RAP Slave function 806, in this instance, acts as a dumb interface to ESD slave function 718 on the appropriate blade, obeying the command contained in the packet.

According to a further aspect of the embodiments, RAPMaster 804 takes all information it receives from each of the RAPSlaves 806 (one for each SDMS 514) and feeds it into RSTP 702, after performing suitable port number translation. Then, any output from RSTP 702 is captured by RAPMaster 804, translated, and send to the appropriate RAPSlave 806. In this manner, and according to an embodiment, RAPMaster 804 and RAPSlave 806 acts as a transparent layer below RSTP 702 allowing a single RSTP instance to command the entire product (master Ethernet bridge 501), despite the fact that the product consists of multiple CPUs and Ethernet switches.

According to a further aspect of the embodiments, RAP slave function 806 also sends packets in the reverse direction, as required. The packets to be transmitted can be implemented as shown below in Table 2. As those of skill in the art can appreciate, Ethernet RAP causes the steps of method 900 to occur, and embodies the functions 804, 806, and interfaces 808, 810, and 812, according to aspects of the embodiment via interaction between RAMP software 510 embodied as RAP master function 804 (in MDMS CPU 503) and RASP software 512 as embodied in RAP slave function 806 in any one or all of the CPUs of the blades/SDMS 514.

Thus, Ethernet RAP can be implemented with the addition of only a single new communication layer (RAP master function 804 to RAP slave function 806).

TABLE 2

| RAP (RSTP Aggregation Protocol) packets contain: | TYPE + LENGTH + DATA |
|---|---|

Table 2 describes the format of all RAP packets. The DATA field is interpreted based on packet type. The various packet types are elaborated in Tables 3 and 4.

According to further aspects of the embodiments, one or more RAP packets can be placed in the payload of Ethernet sub-network access protocol (SNAP) frames and a unique organizationally unique identifier (OUI) assigned to Crestron by the Institute of Electrical and Electronic Engineers (IEEE). This is part of what ensures compatibility when interoperating with equipment from other vendors. The packets in the Ethernet SNAP frames can then sent between RAP slave function 806 and RAP master function 804 as needed. According to further embodiments, the following types of packets are supported for transmissions from RAP master function 804 to RAP slave function 806 over RAP master-RAP slave interface 810.

TABLE 3

| SetRstpPortStates: | |
|---|---|
| Data = | bitmap of RSTP states to set (2 bits/port * 8 ports = 2B) |
| SendBPDU: | |
| Data = | CRES_BPDU_ADV struct (less than 100B) |

As those of skill in the art can appreciate, SetRstpPortStates sets the RSTP Port State of the specified blade port, and. SendBPDU encapsulates a BPDU to be transmitted on the specified blade port. These types of packets are known to those of skill in the art, and as such, in fulfillment of the dual purposes of clarity and brevity, a detailed discussed thereof shall not be repeated.

According to further aspects of the embodiments, one or more RAP packets can be placed in the payload of Ethernet SNAP frames and a unique OUI (IEEE Organizationally Unique Identifier) assigned to Crestron. This is part of what ensures compatibility when interoperating with equipment from other vendors. The packets in the Ethernet SNAP frames can then sent between RAP slave function 806 and RAP master function 804 as needed. According to further embodiments, the following types of packets are supported for transmissions from RAP slave function 806 to RAP master function 804 over RAP master-RAP slave interface 810:

TABLE 4

| PortLinkStates: | |
|---|---|
| Data = | bitmap of port link status (8 bits = 1B) |
| ReceiveBDPU: | |
| Data = | CRES_BPDU_ADV struct (less than 100B) |

PortLinkStates specifies the LinkState (UP/DOWN) for each blade port, and ReceiveBPDU encapsulates an inbound BPDU for transport to RSTP function 702 in MDMS CPU 503. These types of packets are known to those of skill in the art, and as such, in fulfillment of the dual purposes of clarity and brevity, a detailed discussed thereof shall not be repeated.

As described above, an encoding process is discussed in reference to FIGS. 8 and 9, the former which described new Ethernet functions embodied in several instances of software programs, and the latter which describes method 900. The encoding process is not meant to limit the aspects of the embodiments, or to suggest that the aspects of the embodiments should be implemented following the encoding process. The purpose of the following encoding process is to facilitate the understanding of one or more aspects of the embodiments and to provide the reader with one or many possible implementations of the processed discussed herein. FIG. 9 illustrates a flowchart of various steps performed during the encoding process. The steps of FIG. 9 are not intended to completely describe the encoding process but only to illustrate some of the aspects discussed above.

According to embodiment, master Ethernet bridge 501 includes MDMS 502 and SDMS 504, which can be a DM-MD64×64 64×64 DigitalMedia™ switcher available from Crestron Electronics Inc. of Rockleigh N.J.

INDUSTRIAL APPLICABILITY

To solve the aforementioned problems, the aspects of the embodiments are directed towards an Ethernet network that provides a substantially robust system that prevents cycles and packet storms by providing an RSTP aggregation protocol (RAP) that adds several new RSTP functions to the master CPU and each of the slave CPUs in the blades of a master Ethernet bridge. The RAP provides a mapping function between each enabled system port in the master Ethernet bridge 501 and uniquely maps the same to a unique blade and port number, so that efficient and effective communications can occur between any cascaded device attached to any port of any blade of the master Ethernet bridge 501; this, in effect, reduces the total number of bridges in the Ethernet network, which makes accommodating topology changes substantially easier, and less prone to the aforementioned packet storms than a conventional Ethernet network that only implements conventional RSTP.

The following is a list of the acronyms used in the specification in alphabetical order.
BPDU Bridge Protocol Data Unit
BSP Board Support Package
CPU Main Central Processor Unit
DM Digital Media
EFAM Ethernet function architecture—MDMS
EFAS Ethernet function architecture—SDMS
EP End Points
ESD Ethernet Switch Driver
ESW Ethernet Switch
HAL Hardware Abstraction Layer
IEEE Institute of Electrical and Electronic Engineers
Input/Output
MDMS Master Digital Media Switch
OUI IEEE Organizationally Unique Identifier
RAMP RSTP Aggregate Master Protocol
RAN RSTP Aggregation Network
RAP RSTP Aggregation Protocol
RASP RSTP Aggregate Slave Protocol
RSTP Rapid Spanning Tree Protocol
SDMS Slave Digital Media Switch
SNAP Subnetwork Access Protocol
TDMS Time Division Multiplexing Signal
UDP User Data Protocol The disclosed embodiments provide a system, software, and a method for providing a master Ethernet bridge that includes a master central processing unit (CPU), and a plurality of slave central processing units (CPU), wherein, each of the master CPU and slave CPUs includes memory that contains a program that embodies a plurality of Ethernet functions adapted to substantially prevent re-routing of signals that are intended to be transmitted from the master CPU to a first slave CPU by providing a mapping function that correlates a plurality of system ports of the master Ethernet bridge to a set of unique board numbers and port numbers associated with each of said board numbers, wherein each of the board numbers represent an input or output board which contains respective slave CPUs, and the associated port numbers represent the ports for the respective input or output boards.

It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

All United States patents and applications, foreign patents, and publications discussed above are hereby incorporated herein by reference in their entireties.

Alternate Embodiments

Alternate embodiments may be devised without departing from the spirit or the scope of the different aspects of the embodiments.

What is claimed is:

1. An Ethernet Network comprising:
   one or more cascaded Ethernet devices; and
   a master Ethernet bridge that includes
      a master central processing unit (CPU) and associated master Ethernet switcher, and
      one or more slave central processing units (CPU), each having an associated slave Ethernet switcher, each of the associated slave Ethernet switchers connected to a plurality of input/output ports (ports), and wherein each of the plurality of ports is assigned a respective port number, each of the ports being connected to one of the one or more of the cascaded Ethernet devices, and wherein,
      each of the master CPU and slave CPUs includes memory that contains a program that embodies a plurality of Ethernet functions adapted to substantially prevent re-routing of Ethernet commands by providing a mapping function that correlates the plurality of ports to respective ones of the one or more slave CPU and slave Ethernet switcher, and wherein
      the Ethernet functions comprise a Rapid Spanning Tree Protocol (RSTP) aggregate protocol slave (RAPSlave) function for each of the slave CPUs adapted to provide port activity information for respective ports attached to respective slave Ethernet switchers, and
      a Rapid Spanning Tree Protocol aggregate protocol master (RAPMaster) function adapted to (a) receive the port activity information from each of the one or more RAPSlave functions, (b) perform a port number-to-blade port mapping based on the received port activity information received from each of the RAPSlave function, and (c) provide the port activity information and the port mapping to an RSTP function.

2. The Ethernet network according to claim 1, wherein the RAPMaster function is further adapted to capture any Ethernet command from the RSTP function, map the received Ethernet command to the appropriate port, and forward the mapped Ethernet command to the appropriate RAPSlave function of the appropriate slave CPU.

3. The Ethernet network according to claim 1, wherein the RAPMaster and RAPSlave functions are further adapted to act as a transparent layer below the RSTP function, thereby allowing a single instance of the RSTP function to control the master Ethernet bridge.

4. The Ethernet network according to claim 1, wherein the master CPU is part of a master digital media switcher (MDMS), and the slave CPU is part of a slave digital media switcher (SDMS).

5. The Ethernet network according to claim 4, further comprising:
   one or more digital media sinks connected to respective ports of the one or more cascaded Ethernet devices and master Ethernet bridge;
   one or more digital media sources connected to respective ports of the one or more cascaded Ethernet devices and master Ethernet bridge; and
   one or more digital media signal processors connected to respective ports of the one or more cascaded Ethernet devices and master Ethernet bridge.

6. An Ethernet bridge comprising:
   a master central processing unit (CPU) and associated master Ethernet switcher, and
   one or more slave central processing units (CPU), each having an associated slave Ethernet switcher, each of the associated slave Ethernet switchers connected to a plurality of input/output ports (ports), and wherein each of the plurality of ports is assigned a respective port number, and wherein,
      each of the master CPU and slave CPUs includes memory that contains a program that embodies a plurality of Ethernet functions adapted to substantially prevent re-routing of Ethernet commands by providing a mapping function that correlates the plurality of ports to respective ones of the one or more slave CPU and slave Ethernet switcher, and wherein the Ethernet functions comprise a Rapid Spanning Tree Protocol (RSTP) aggregate protocol slave (RAPSlave) function for each of the one or more slave CPUs adapted to provide port activity information for respective ports attached to respective slave Ethernet switchers, and a Rapid Spanning Tree Protocol aggregate protocol master (RAPMaster) function adapted to (a) receive the port activity information from each of the one or more RAPSlave functions, (b) perform a port number-to-blade port mapping based on the received port activity information received from each of the RAPSlave function, and (c) provide the port activity information and the port mapping to an RSTP function.

7. The Ethernet bridge according to claim 6, wherein the RAPMaster function is further adapted to capture any Ethernet command from the RSTP function, map the received Ethernet command to the appropriate port, and forward the mapped Ethernet command to the appropriate RAPSlave function of the appropriate slave CPU.

8. The Ethernet bridge according to claim 6, wherein the RAPMaster and RAPSlave functions are further adapted to act as a transparent layer below the RSTP function, thereby allowing a single instance of the RSTP function to control the master Ethernet bridge.

9. The Ethernet bridge according to claim 8, wherein the master CPU is part of a master digital media switcher (MDMS), and the slave CPU is part of a slave digital media switcher (SDMS).

10. The Ethernet bridge according to claim 9, wherein the Ethernet bridge is part of an Ethernet network that comprises one or more digital media sinks connected to respective ports of the one or more cascaded Ethernet devices and master Ethernet bridge;

one or more digital media sources connected to respective ports of the one or more cascaded Ethernet devices and master Ethernet bridge; and one or more digital media signal processors connected to respective ports of the one or more cascaded Ethernet devices and master Ethernet bridge.

11. A method for processing Ethernet commands in a master Ethernet bridge that is part of an Ethernet network, the method comprising:

receiving a plurality of port activity information at a second Ethernet function from a first Ethernet function; and using the received plurality of port activity information by the second Ethernet function to create a map of a plurality of ports in the master Ethernet bridge, and wherein the port activity information represents a level of activity on a respective port that is part of the master Ethernet bridge, and further wherein the port activity information contains a port number that represents a location within the master Ethernet bridge, and further wherein the location associated with the port number represents a particular input/output port (port) of a particular one of N blades of the master Ethernet switcher, wherein each of the one of N blades includes a slave central processing unit and associated slave Ethernet switcher, such that the mapping in the second Ethernet function correlates a port number to a blade number and associated blade port number.

12. The method according to claim 11, further comprising:

receiving an Ethernet command at the second Ethernet function from the first Ethernet Function, wherein the first Ethernet function provides the Ethernet command to the first Ethernet function with an associated port number;

forwarding the receiving Ethernet command from the second Ethernet function to a third Ethernet function;

processing the forwarded Ethernet command by the third Ethernet function;

receiving the processed Ethernet command at the second Ethernet function from the third Ethernet function;

mapping the received Ethernet command by the second Ethernet function such that the received Ethernet command can be sent to an intended blade and associated blade port; and forwarding the received and mapped Ethernet command to the appropriate blade and associated blade port that corresponds to the associated port number.

13. The method according to claim 12, wherein the first function is a rapid spanning tree protocol (RSTP) aggregate protocol slave function associated with one of plurality of blades of a master Ethernet bridge device, the second function is an RSTP aggregate protocol (RAP) master function associated with a master central processing unit (CPU) of the master Ethernet bridge device, and the third function is an RSTP function associated with the master CPU of the master Ethernet bridge device.

14. A functional distribution of Ethernet functions within a master Ethernet bridge, the master Ethernet bridge including a plurality of blades and ports associated with respective blades, the blades including a slave central processing unit and associated slave Ethernet switcher, and further including a master CPU and associated master Ethernet switcher, the functional distribution of Ethernet functions comprising:

a rapid spanning tree protocol (RSTP) Ethernet function located within the master CPU and adapted to enable and disable ports on the master Ethernet bridge;

a plurality of RAP slave Ethernet functions located on respective ones of the plurality of slave CPUs and adapted to generate port activity information for each of the ports associated with the blade and the RAP slave Ethernet function; and an RSTP aggregate protocol (RAP) master Ethernet function located within the master CPU and adapted to (a) receive the generated port activity information from each of the plurality of RAP slave Ethernet functions, (b) create a map of the master Ethernet bridge that correlates a port number to a blade number and associated blade port number using the received port activity information from each of the plurality of RAP slave functions, (c) transmit and receive Ethernet commands to and from the RSTP Ethernet function, and (d) map Ethernet commands received from the RSTP Ethernet function to the correct blade and port of the blade using the created map of the Master Ethernet bridge.

* * * * *